(No Model.)

F. G. JOHNSON.
SPRING WASHER.

No. 404,284. Patented May 28, 1889.

WITNESSES:
Gustav Dieterich
W. T. B. Milliken

INVENTOR,
Frank G. Johnson.

UNITED STATES PATENT OFFICE.

FRANK G. JOHNSON, OF NEW YORK, N. Y.

SPRING-WASHER.

SPECIFICATION forming part of Letters Patent No. 404,284, dated May 28, 1889.

Application filed October 17, 1888. Serial No. 288,338. (No model.)

*To all whom it may concern:*

Be it known that I, FRANK G. JOHNSON, a citizen of the United States, residing in the city, county, and State of New York, have invented a new and useful Spring-Washer for Bolts, of which the following is a specification.

The object of my invention is to provide a spring-washer for bolts, to be used under the nuts thereof, that will afford a sufficient scope of elasticity to keep a constant tension strain between the heads and nuts of bolts irrespective of the slackness thereof caused by attrition.

The peculiarity or nature of my washer consists in making a spring-metal washer of such a peculiar shape or form as will admit of all its parts being compressed into a common plane without causing a compression of any of the metal in some of its parts and an expansion or stretching in other parts, which would cause the washer to set and be deprived of its elasticity. This I accomplish by cutting away alternate internal and external portions of the washer-zone, and then giving the remaining portions a zone-like concavity and convexity from the inner to the outer rim—that is, from the bolt-hole to the periphery.

A fuller description of my invention is set forth in the following specification, and illustrated by the accompanying drawings, in which—

Figure 1:
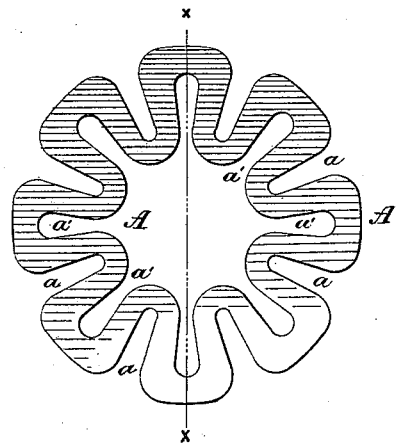
Figure 2:
Figure 3:
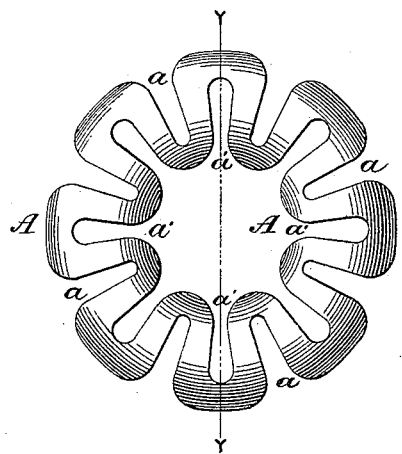
Figure 4:

Figure 1 represents a plan view as the washer appears when punched out by dies and it is still flat; Fig. 2, a section on the line *x x* of Fig. 1; Fig. 3, a plan view as the washer appears when ready for use, having been stamped or further formed, showing a zone-like concavity in all its parts; and Fig. 4, a section on the line *y y* of Fig. 3, which better illustrates the zone-like concavity.

Similar letters refer to similar parts throughout the several views.

A A, Figs. 1 and 2, show the washer as it appears when perfectly flat. *a a* show what portions of the metal are cut away from the periphery toward the center, and *a' a' a'* show the portions cut away from the bolt-hole toward the periphery. These openings *a a a* and *a' a' a'*, produced by removing a portion of the metal, are of such form that they can be punched out with a die, those extending from the bolt-hole toward the periphery being larger at their outer ends, and the inner edge of the washer between these openings *a' a' a'* are rounded, and the portions of the periphery between the openings *a a a* are also rounded, whereby the washer-zone is made serpentine or zigzag in form. The washer is now bent or pressed into the form shown by Figs. 3 and 4, (best seen in Fig. 4,) which is that of a zone-like concavity on one side and convexity on the other extending transversely from the inner turns of the zigzag zone of the washer to the outer turns of the said zigzag zone.

Having thus described my invention, it is seen that the spring action of my washer does not extend transversely across the entire diameter of the washer, but only from the outer points or turns of the zigzag zone to the inner points of the same.

The mode of constructing my washer prevents the compression of the metal on the inner portions and its stretching on the outer portions when it is flattened out in use, which would be the case in a plain dished washer in whatever shape it might be made.

What I claim as new and useful, and desire to secure by Letters Patent, is—

A spring-washer, A A, for bolts having its zone in the form of a zigzag strip of metal, and having its said zigzag zone from the inner to the outer turns thereof concave on one of its sides and convex on the other side, whereby no part of the metal is compressed or stretched when the washer is flattened out, substantially in the manner and for the purpose set forth.

FRANK G. JOHNSON.

Witnesses:
CHARLES A. RUNK,
FRANK R. JOHNSON.